(No Model.) 2 Sheets—Sheet 2.
M. R. WIERS.
HOLDBACK FOR VEHICLES.
No. 467,320. Patented Jan. 19, 1892.
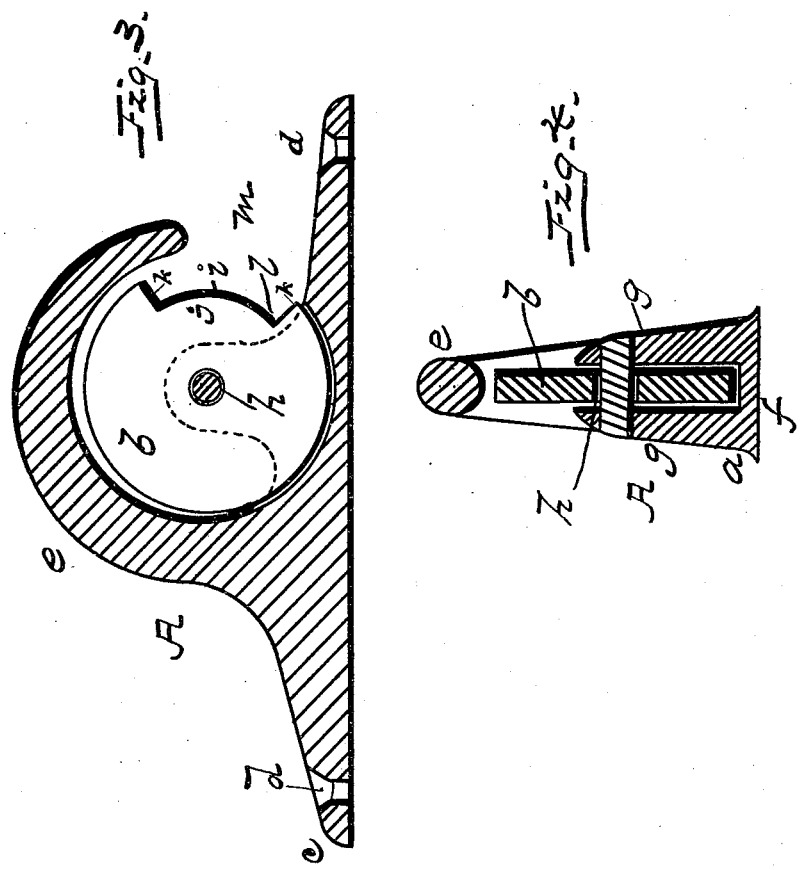
WITNESSES
Jas. B Clarke
M. M. Mosher
INVENTOR
M. R. Wiers
by E. H. Bates Attorney

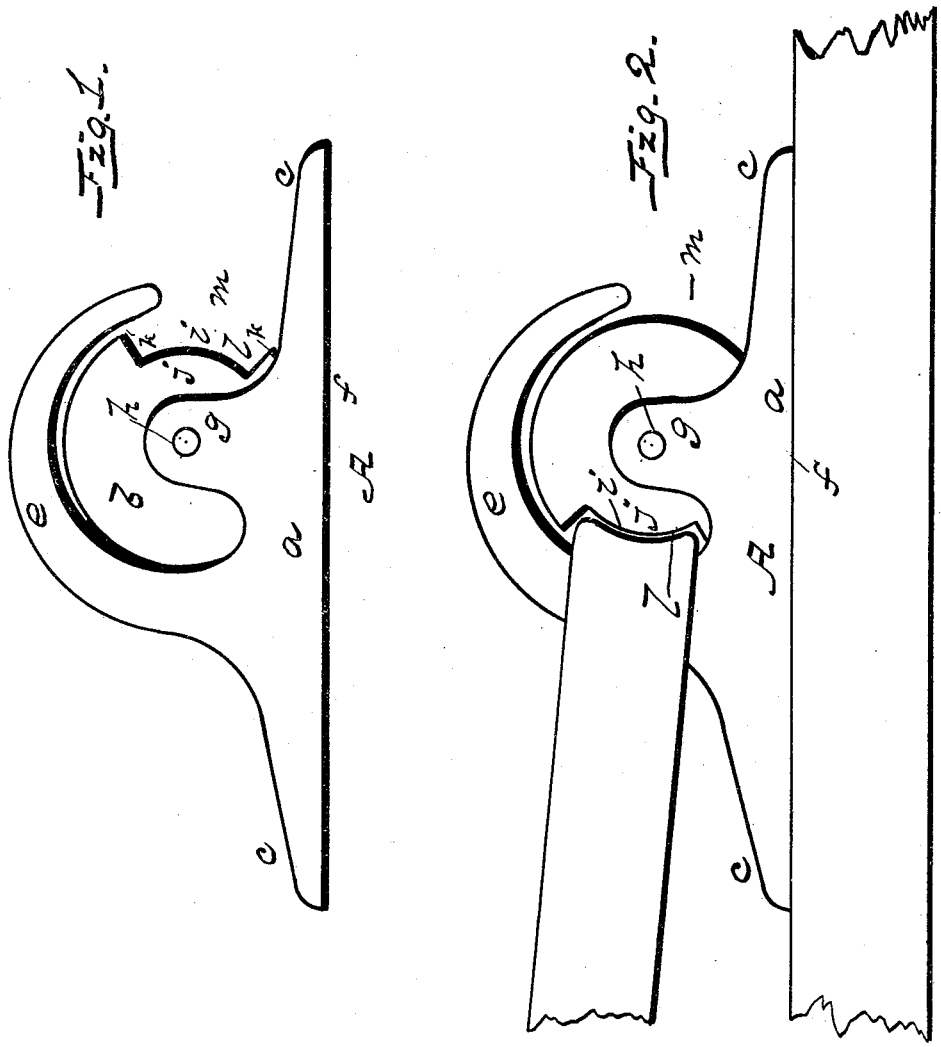

UNITED STATES PATENT OFFICE.

MICHAEL R. WIERS, OF OWOSSO, MICHIGAN.

HOLDBACK FOR VEHICLES.

SPECIFICATION forming part of Letters Patent No. 467,320, dated January 19, 1892.

Application filed October 1, 1891. Serial No. 407,423. (No model.)

*To all whom it may concern:*

Be it known that I, MICHAEL R. WIERS, a citizen of the United States, residing at Owosso, in the county of Shiawassee and State of Michigan, have invented certain new and useful Improvements in Holdbacks for Vehicles; and I do hereby declare the following to be a full, clear, and exact description of the invention, such as will enable others skilled in the art to which it appertains to make and use the same.

This invention relates to novel improvements in that class of devices known as "holdbacks" for the thills of vehicles and to which the breeching-straps of a harness are attached; and it consists in the construction and arrangement of the parts whereby the breeching-strap may be released therefrom without the aid of a person, and is so arranged that when an animal runs off and the traces are disconnected with the thills the breeching and its straps are readily released from the device or holdback by the animal going forward, all as will be hereinafter more fully explained, and particularly pointed out in the appended claim.

The annexed drawings, to which reference is made, fully illustrate my invention, in which—

Figure 1 represents a side view of my improved holdback, the breeching-strap being removed or released therefrom. Fig. 2 is also a side view of the same, showing a breeching-strap in position when in use. Fig. 3 is a vertical longitudinal sectional view, and Fig. 4 is a vertical transverse sectional view of the same.

Referring by letter to the accompanying drawings, A designates the holdback, consisting of the casting $a$, which is secured to a thill, and the revolving disk $b$. This casting is constructed with opposite extended ends $c\ c$, which have openings $d\ d$ for the screws by which it is secured to the thills, and rising from this casting is a curved hook portion $e$, and between said hook and base $f$ are bearings or lugs $g$, which extend from said base and form a support for the holding-disk aforesaid. This casting has a space between the hook and base, which is open at its sides, as shown in Figs. 1 and 2, permitting the breeching-strap to pass freely in and out of the holdback. The lugs are provided with perforations $h\ h$ or bearings for the journal of the holding-disk. This disk is cut away, as at $i$, leaving a reduced portion $j$ and having shoulders $k\ k$, between which is the space $l$, in which the strap is placed when in position, the hook portion serving as a cover for said space $l$ and preventing the strap from displacement, and upon which is the pressure of the strap in holding the vehicle back.

It will thus be seen by reference to the annexed drawings and the above description that should an accident occur or the animal attempts to run away and the traces are disconnected he can walk out of the thills, the strap passing over the hook, at the same time revolving the disk, bringing the cutaway or reduced portion thereof opposite the opening $m$ between said hook and base, and it is simple in construction, simple in operation, and at the same time cheap to manufacture, as well as being durable and ornamental. It will be further observed that by my construction of the holdback I dispense with springs, snaps, or other attachments, which are liable to get out of order, and provide simply a revolving disk having the elongated cut-away portion to receive the holdback-strap, said disk being guided and held in place by the upwardly-extended lugs on the base.

Having described my invention, what I claim, and desire to secure by Letters Patent, is—

In a holdback for thills, the base provided with the extensions or lugs $g\ g$, having perforations $h\ h$, said lugs extending midway between the base $a$ and hook $e$, said hook and lugs formed integral with the base, and the disk $b$, having the elongated reduced portion $j$ and shoulders $k\ k$ at each end thereof, the whole combined and arranged as shown and described.

In testimony whereof I affix my signature in presence of two witnesses.

MICHAEL R. WIERS.

Witnesses:
ROBERT GRAY,
H. S. SMITH.